United States Patent [19]
Kriska et al.

[11] Patent Number: 5,342,082
[45] Date of Patent: Aug. 30, 1994

[54] AIRBAG REACTION CANISTER HAVING SOFTENED EDGES

[75] Inventors: Thomas M. Kriska, Kaysvile; Donald R. Lauritzen, Hyrum; Larry D. Rose, Layton, all of Utah

[73] Assignee: Morton International, Inc., Chicago, Ill.

[21] Appl. No.: 69,095

[22] Filed: May 28, 1993

[51] Int. Cl.⁵ ............................................. B60R 21/20
[52] U.S. Cl. .................... 280/728 A; 220/667; 220/670; 280/732
[58] Field of Search .............. 280/728 R, 728 A, 731, 280/732; 220/666, 667, 669, 670, 671, 676

[56] References Cited

U.S. PATENT DOCUMENTS

| | | | |
|---|---|---|---|
| 4,703,669 | 11/1987 | Hyodo | 74/492 |
| 4,941,678 | 7/1990 | Lauritzen et al. | 280/732 |
| 4,943,027 | 7/1990 | Nakayama | 248/548 |
| 4,964,654 | 10/1990 | Bishop et al. | 280/743 |
| 5,044,663 | 9/1991 | Seizert | 280/730 |
| 5,062,664 | 11/1991 | Bishop et al. | 280/743 |
| 5,195,776 | 3/1993 | Sakakida et al. | 280/732 |
| 5,209,519 | 5/1993 | Shiga et al. | 280/728A |

FOREIGN PATENT DOCUMENTS

2-306846  12/1990  Japan ............................... 280/728 A

*Primary Examiner*—Eric Culbreth
*Attorney, Agent, or Firm*—George W. Rauchfuss; Gerald K. White

[57] ABSTRACT

A reaction canister for a vehicle passive restraint system has its side walls weakened in the regions adjoining edges which are adjacent automotive panels likely to be impacted by occupants in the event of a low speed collision. The resultant softening serves to prevent injury.

4 Claims, 3 Drawing Sheets

U.S. Patent  Aug. 30, 1994  5,342,082
FIG. 1
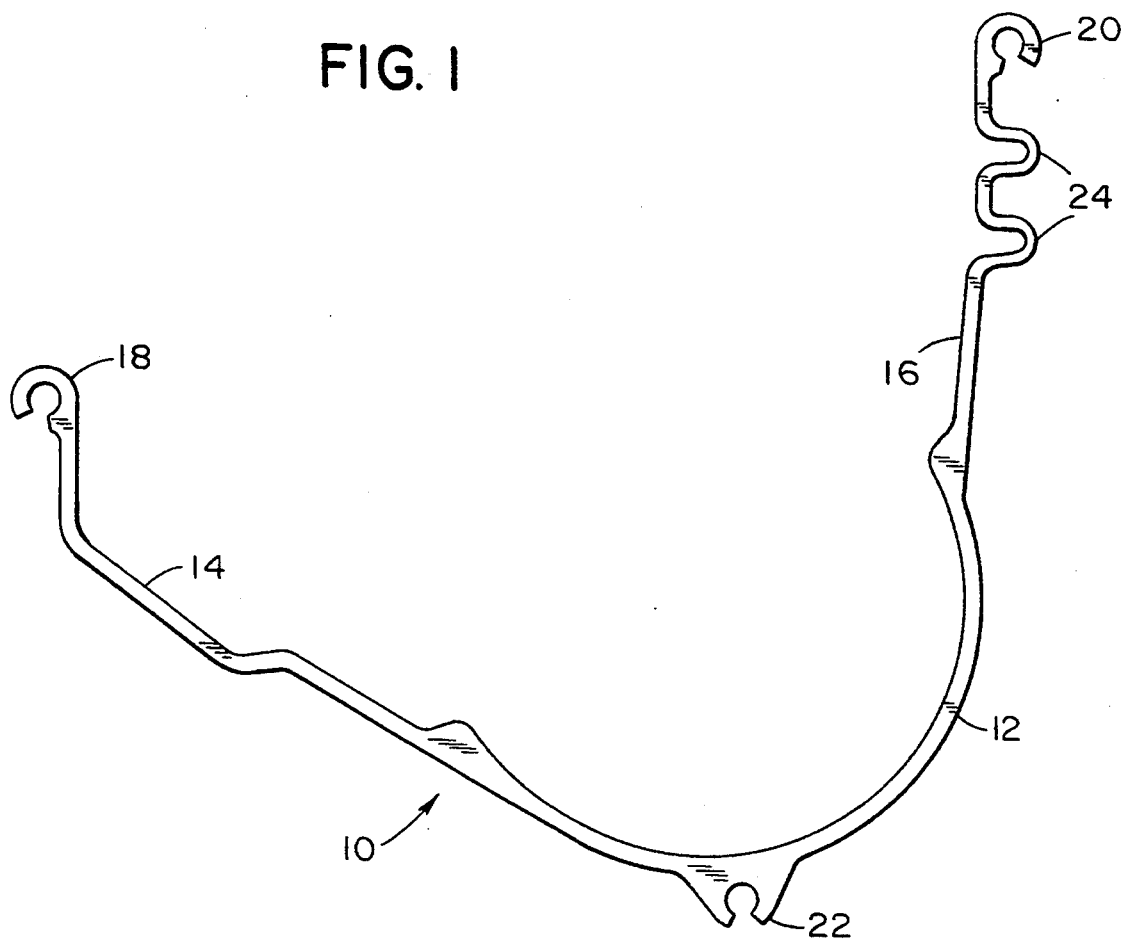
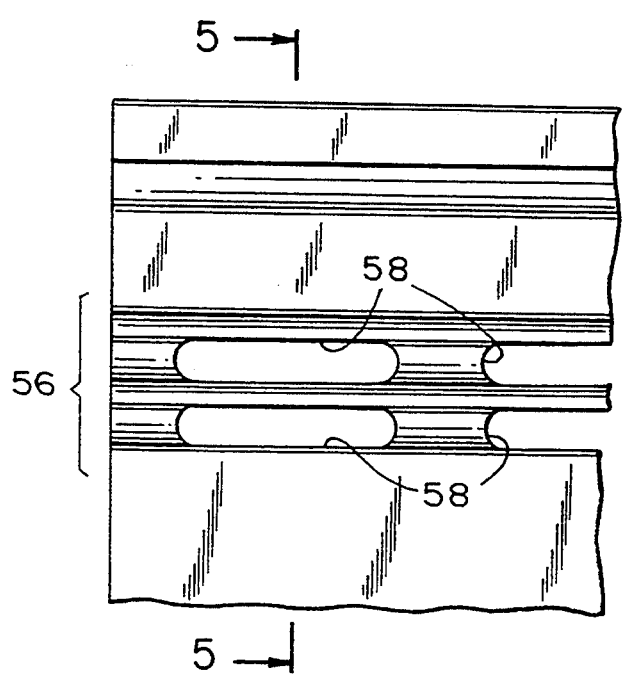
FIG. 4
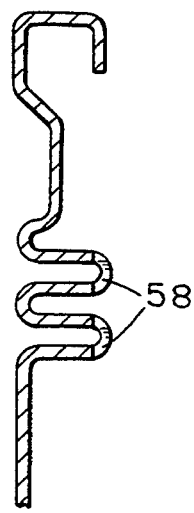
FIG. 5

AIRBAG REACTION CANISTER HAVING SOFTENED EDGES

BACKGROUND OF THE INVENTION

This invention relates to an inflation passive restraint system for use in a motor vehicle for restraining a seated occupant during a collision. More particularly, it relates to an improvement in the structure of the reaction canister to reduce the potential for head injuries during low speed accidents.

The reaction canister of a vehicle passive restraint system provides protection for the gas generator and the inflatable bag until the bag deploys. A reaction canister is normally formed of a trough-shaped sidewall which may be extruded and cut to the desired length. The ends of the sidewall are closed by end plates which may be flat aluminum sheets or may also be extruded when required to reduce the machining required. An example of a reaction canister in accordance with the prior art will be found in U.S. Pat. No. 4,941,678 of Lauritzen, et al.

The reaction canister of the restraint system is normally positioned behind the instrument panel of a vehicle. The edges of the reaction canister may be within one inch, and sometimes closer, to the back surface of the instrument panel. In the event of a low speed accident without bag deployment, a person's head or other body part may make impact with the instrument panel and drive it against the edge of the reaction canister. Not only can this cause injury to the vehicle occupant, but it can also cause failure to meet standards imposed by the National Highway Safety Administration.

One approach to solving this problem has been to add flanges or rounded edges to the otherwise open edges of the reaction canister. This has helped to a degree but the canister still remains very stiff. Another approach has been to add a pattern of slots in the trough-like sidewall and in the end panels. This has helped to soften the edges but has also weakened the canister with respect to lateral displacement or "bell mouthing." It also creates potential snag points for the bag. Another approach has been to cut down the sidewalls and end plates, thereby leaving the bag exposed to act as an impact cushion. This, however, leaves the bag unsupported and unprotected.

Accordingly, it is a primary object of the present invention to provide an improved reaction canister having softened edges which yield to direct impact but resist lateral displacement. Other objects, features, and advantages will become apparent from the following description and appended claims.

SUMMARY OF THE INVENTION

In accordance with this invention, a reaction canister is provided for housing and positioning the gas generator and inflatable bag of a passive restraint system. The canister comprises a trough-shaped, preferably extruded, body and a plate for each end. In order to soften the edges which are adjacent to the vehicle's instrument panel, the walls of both the troughshaped body and the end plates are weakened. This may be accomplished, for example, by means of serpentine configurations, such as corrugations, and by perforations.

DESCRIPTION OF THE DRAWINGS

FIG. 1 is an end view of an extruded aluminum body portion of a reaction canister having one weakened wall;

FIG. 4 is an elevational view of a segment of a modified form of weakened reaction canister wall; and FIG. 5 is a cross section taken substantially along the line 5—5 of FIG. 4.

DESCRIPTION OF THE PREFERRED EMBODIMENT

Figure 2:
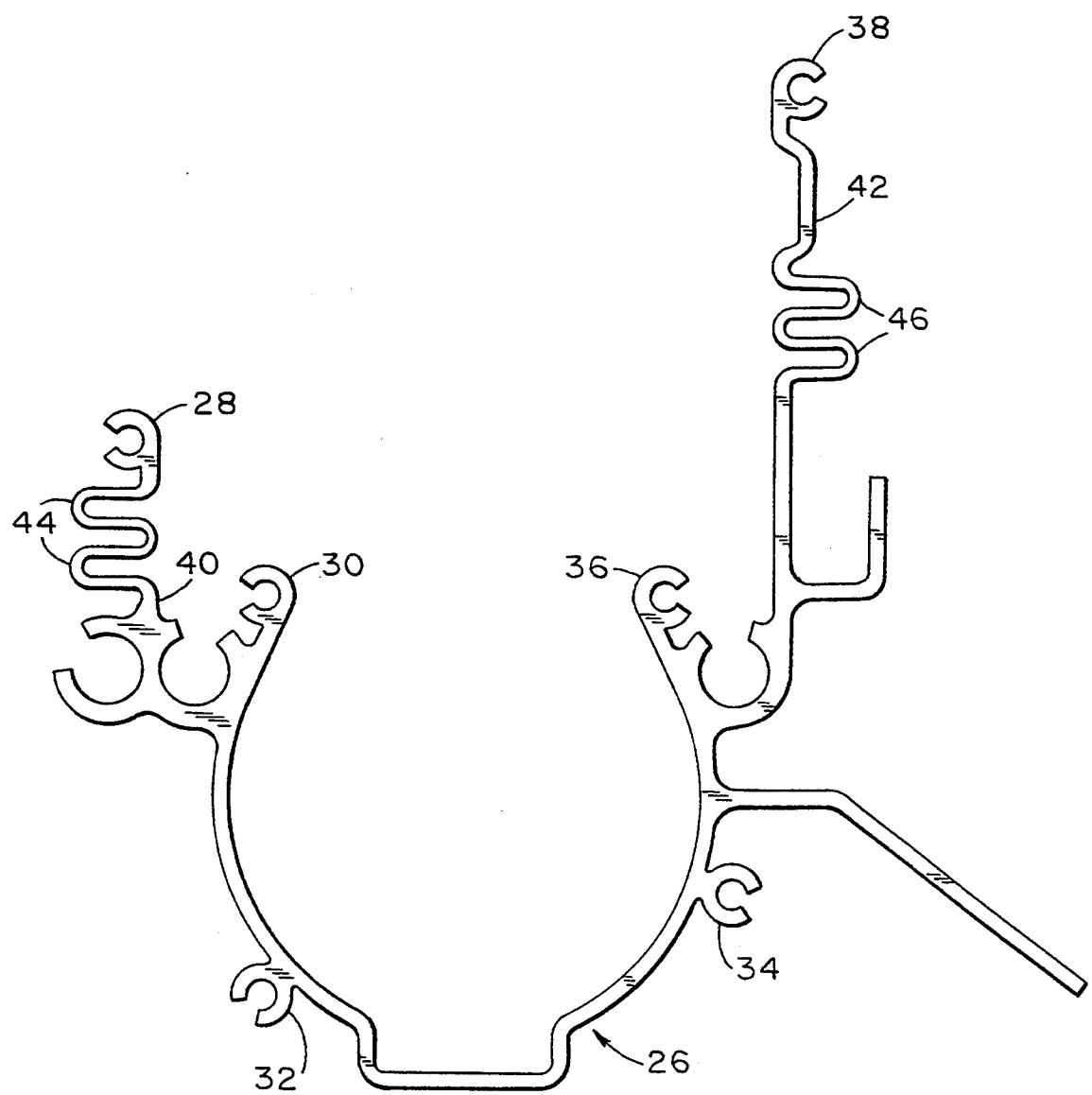
FIG. 2 is an end view of another extruded aluminum body portion of a reaction canister having two weakened walls.

FIG. 1 illustrates the end of an elongated trough-shaped body part 10 for a reaction canister. It is an asymmetrical long, narrow, open receptacle having a rounded bottom wall 12 and opposite sidewalls 14, 16. End plate attachments are provided in the form of retaining screw rings 18, 20, 22.

The reaction canister which incorporates the body parts shown in FIG. 1 is installed in such a manner that only the edge of the sidewall 16 lies adjacent an instrument panel. Accordingly, only this one wall is weakened. The weakening is imparted by forming corrugations 24 in the body part 10. As a result of these corrugations, an impact on the edge of the sidewall 16 causes the corrugations 24 to crumple, thereby avoiding injury through the displaced instrument panel.

Figure 3:
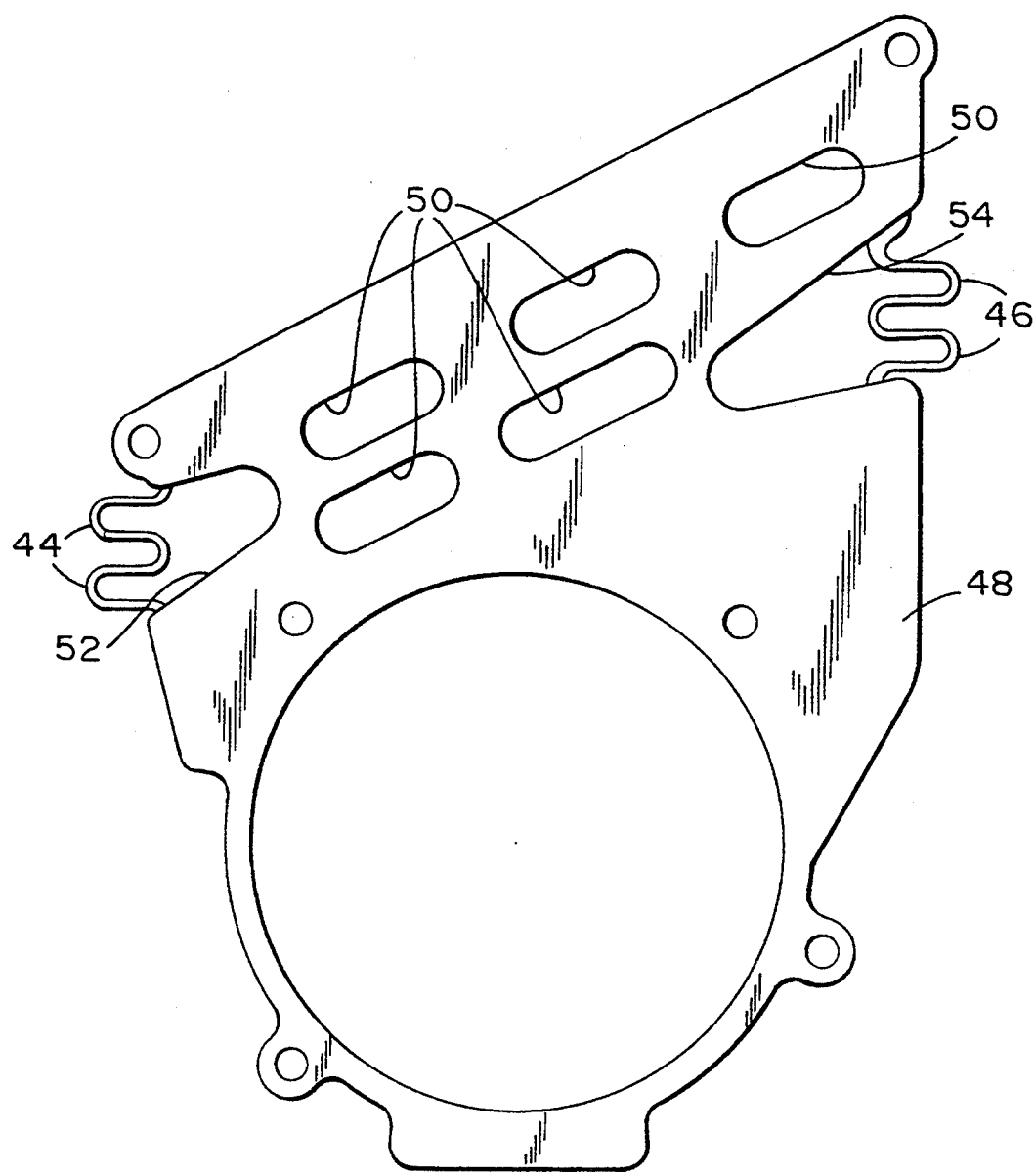
FIG. 3 is an end view of a reaction canister incorporating the body part of FIG. 2 with an end plate attached thereto.

FIGS. 2 and 3 illustrate a reaction canister formed from a more complex extruded body part 26. The body part 26 includes six retaining screw rings 28, 30, 32, 34, 36, 38 for end plate mounting and includes two sidewalls 40, 42. The reaction canister of FIGS. 2 and 3 is mounted in a vehicle with the edges of both sidewalls adjacent an instrument panel. Accordingly, corrugations 44 are provided in one sidewall and corrugations 46 in the other. An end plate 48 is secured to each end of the body part 26. The sidewall of the end plate 48 whose edge lies adjacent the instrument panel is weakened by means of oval-shaped openings 50 and by V-shaped insets 52, 54.

As a result of the illustrated structure, downward forces (as viewed in FIG. 3) on the reaction canister by a displaced instrument panel portion will cause the corrugations 44, 46 and the material of the end plates between the openings 50 and the insets 52, 54 to crumple, thereby helping to prevent any serious injury.

FIG. 4 illustrates in detail another collapsible section 56 which is softened still further in accordance with the invention. Such a section may be formed, rolled, etc. in a steel or aluminum sheet fabricated canister. Additional softening is achieved by means of holes or slots 58 formed or pierced in, and repeated along the length of, the corrugations substantially as illustrated.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

We claim:

1. In an automotive airbag reaction canister comprising a trough-shaped sidewall having first and second edges and an end plate mounted to each end of the sidewall to form a housing for an airbag and inflator, said canister being adapted for installation behind, and adjacent to, an automotive panel, the improvement which comprises:

corrugations formed in said sidewall adjacent each of said first and second edges, said corrugations being characterized by a plurality of substantially parallel adjacent planar surfaces separated by substantially semi-cylindrical portions of said sidewall, whereby said side wall is weakened and collapsible upon impact by forced displacement of said panel.

2. The improvement of claim 1 wherein said semi-cylindrical portions have openings extending therethrough to further weaken said sidewall.

3. The improvement of claim 2 wherein said end plates are weakened to collapse substantially simultaneously with said sidewall.

4. The improvement of claim 3 wherein said end plates are weakened by holes therein.

* * * * *